United States Patent
Amicangioli et al.

(10) Patent No.: US 6,327,242 B1
(45) Date of Patent: Dec. 4, 2001

(54) MESSAGE REDIRECTOR WITH CUT-THROUGH SWITCH FOR HIGHLY RELIABLE AND EFFICIENT NETWORK TRAFFIC PROCESSOR DEPLOYMENT

(75) Inventors: Anthony D. Amicangioli, Newton; Ray Y. Chow, Brookline; David J. Yates, Norwood, all of MA (US)

(73) Assignee: InfoLibria, Inc., Waltham, MA (US)

(*) Notice: Subject to any disclaimer, the term of this patent is extended or adjusted under 35 U.S.C. 154(b) by 0 days.

(21) Appl. No.: 09/040,519

(22) Filed: Mar. 17, 1998

(51) Int. Cl.[7] .................................................. G01R 31/08
(52) U.S. Cl. ........................ 370/216; 370/221; 370/225
(58) Field of Search ................................ 370/389, 392, 370/395, 396, 401, 397, 398, 399, 464, 466, 470, 471, 474, 216, 221, 225

(56) References Cited

U.S. PATENT DOCUMENTS

| | | | |
|---|---|---|---|
| 4,245,343 | | 1/1981 | Frey .......................................... 371/11 |
| 4,575,584 | * | 3/1986 | Smith et al. ........................... 379/279 |
| 5,138,615 | * | 8/1992 | Lamport et al. ...................... 370/400 |
| 5,317,198 | | 5/1994 | Husbands .............................. 307/116 |
| 5,708,776 | | 1/1998 | Kikinis ............................. 395/185.08 |
| 6,046,999 | * | 4/2000 | Miki et al. ............................. 370/395 |
| 6,049,546 | * | 4/2000 | Ramakrishnan ...................... 370/412 |

FOREIGN PATENT DOCUMENTS

| | | |
|---|---|---|
| 0 397 196 A2 | 11/1990 | (EP) . |
| 2 294 132 A | 4/1996 | (GB) . |

* cited by examiner

Primary Examiner—Wellington Chin
Assistant Examiner—Brenda H. Pham
(74) Attorney, Agent, or Firm—Hamilton, Brook, Smith & Reynolds, P.C.

(57) ABSTRACT

A redirector device for enabling highly reliable deployment of in line network traffic server (such as a document cache) or processor (such as a network monitoring and management device). In normal operation, the device selectively redirects traffic at a link layer to the traffic server, by type of message received or client address or application, server address or application, adjacent network node address, or other parameters. However, the device also detects failures of the traffic server, and when appropriate, switches line traffic to bypass the server. This implements a fail safety feature for the server in the sense that a failure causes traffic to be forwarded past the server, thereby enabling the network to remain operational.

23 Claims, 8 Drawing Sheets

■ No attachment point available

MESSAGE REDIRECTOR WITH CUT-THROUGH SWITCH FOR HIGHLY RELIABLE AND EFFICIENT NETWORK TRAFFIC PROCESSOR DEPLOYMENT

BACKGROUND OF THE INVENTION

Computer networks, such as the Internet, private intranets, extranets and virtual private networks, are increasingly being used for a variety of endeavors including the storage and retrieval of information, communication, electronic commerce, entertainment, and other applications. In these networks, certain computers known as servers are used to store and supply information. One type of server, known as a host server, provides access to information such as data or programs stored in various computer file formats but generally referred to as a "document". Each such document is actually a highly formatted computer file containing data structures that are a repository for a variety of information including text, tables, graphic images, sounds, motion pictures, animations, computer program code, and many other types of digitized content information.

Other computers in the network, known as clients, allow a user to access a document by requesting that a copy be sent by the home server over the network to the client.

Documents are typically referenced by the client specifying an address which identifies the server that stores the document. After the user specifies a document address to the client computer, the address portion is sent over the network to a naming service in order to obtain instructions for how to establish a connection with the correct home server. Once the connection is established, the server retrieves the document from its local disk or memory storage and transmits the document over the network to the client. The network connection is then terminated.

Computer and network industry analysts and experts are presently quite concerned that traffic over large networks such as the Internet is becoming so heavy that the very nature of the way in which it is possible to use them may have to change. The present difficulties are no doubt the result of exponential increases in the number of users as well in the number of large documents such as media files being sent. As a result of this unprecedented demand in need for bandwidth and access to networks, Internet Service Providers (ISPs), backbone providers, and other carriers that provide the physical connections necessary to implement the Internet face a corresponding unprecedented demand for bandwidth. This demand exists at all levels of the network hierarchy including Points Of Presence (POPs), central access nodes, network access points, and exchange points, such as metropolitan area exchanges.

As it turns out, much of the traffic on the Internet is redundant in the sense that different users request the same documents from the same servers over and over again. Therefore, it is becoming increasingly apparent that techniques such as document caching may be deployed to reduce the demand for access. A document cache provides a way to reduce the number of repeated requests originating, from say, a given enterprise or ISP for the same document from many clients. By intercepting client requests for the same document, the cache serves copies of the original document to multiple client locations.

Using a cache, the process for providing document files to the client computers changes from the normal process. In particular, when the user of a client computer, connected to say a given enterprise or ISP, requests a document, the cache server is requested to obtain the document from the Internet. While the document is being transmitted down to the client computer, a copy is stored in the cache memory such as a disk local to the cache. Therefore, when another client computer connected to the same enterprise or ISP requests the same document, rather than requesting the document from the Internet, the request is served from the local cache. Because the redundancy rate for Internet information ranges from about 40% up to about 90%, local caching provides significant advantages. Not only is the speed of downloading apparently faster to the users of the client computers, but also the demand for backbone utilization is reduced.

Cache servers can typically be implemented as a proxy server software application running on a network appliance or other computer system that is placed physically between the client application and the document servers. The proxy server acts as a gate keeper, receiving all packets destined for the Internet, and examining them to determine if it can fulfill requests locally. However, when using proxy servers, it is typically necessary to configure the client browser, proxy server, routers, or other network infracture equipment located at an enterprise or ISP in order to redirect the request messages to the proxy server. This is problematic however, since reconfiguration of browsers is typically not possible, and even the reprogramming of routers is considered to be difficult for service providers.

Other problems are created when proxy servers are placed in the path of network traffic. In particular, the message throughput must be reduced in order to allow the proxy to examine each packet. Furthermore, proxy servers create a single point of failure whereby all of the clients connected to the proxy server lose their network access if the proxy server fails.

Therefore, proxy servers are unreliable and do not scale well as the amount of traffic increases.

Similar difficulties exist with other types of network appliances, such as firewalls, security servers, and the like, which are expected to intercept client message traffic.

SUMMARY OF THE INVENTION

The present invention is technique for implementing a traffic processor, such as a cache server, which includes a message redirector for receiving messages such as originating from a network client and redirecting them to the traffic server in a manner which is transparent to other devices connected to the network. The invention in particular involves the use of a cut through switch which is selectively activated upon the type of message or a failure of the traffic server.

In one preferred embodiment, the message redirector is implemented as a four port device connected with two ports providing access to external network connections and two ports connected to the traffic server.

There are a number of other aspects of a preferred embodiment of the invention. For example, redirection of the client messages is preferably invoked at the data link layer.

A watchdog timer running in the traffic server may also be used to control the state of the cut through switch.

Load on the network server or the attached links may also be used to control the state of the cut through switch as a back pressure or load shedding mechanism.

The cut through switch may also be selectively activated based upon the type of message received. The cut through switch may therefore be used to implement filtering by type of message, client address or application, requested server address or application, adjacent hop address, or other parameters.

The invention enables highly reliable online deployment of network traffic servers such as a document caches. Under normal operation the redirector directs traffic to the server for processing. However, it detects failures of the server, and within a short amount of time, switches line traffic to bypass the server altogether. This then achieves fail safety for traffic server in the sense that the failure of the server merely causes traffic to be forwarded past the server. The network thus remains operational in the presence of cache server failures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
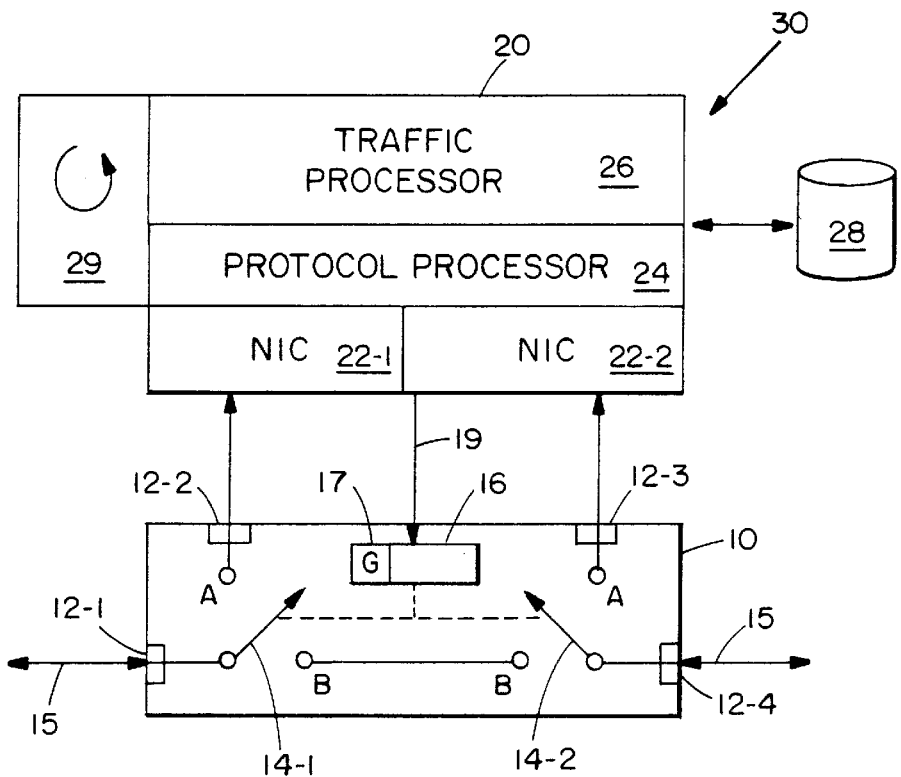
FIG. 1 is a diagram of a network server and link layer redirector according to the invention.

Referring now to the drawings more particularly, FIG. 1 is a block diagram of a message redirector 10 which cooperates with a message traffic or network server 20 to implement data link layer proxying and a cut through switch to achieve the advantages of the present invention. The redirector 10 has four ports 12-1, 12-2, 12-3, 12-4 (collectively, ports 12), a pair of switches 14-1, 14-2, and a switch control logic circuit 16.

Ports 12-1 and 12-4 provide a connection through a network 15 to other devices such as through a local area network (LAN) or wide area network (WAN). The particular type of other devices in the network 15 depend upon the place in the network infrastructure in which the redirector 10 and server 20 are placed. For example, the redirector 10 and server 20 may be deployed at network access sites such as points of presence (POPs) at an Internet Service Provider (ISP), or at ISP peering points, or at interchange points in a large-scale enterprise network, central offices in a local exchange carrier network, Metropolitan area exchanges, and other points in a network through which traffic is concentrated. The network ports 12-1, 12-4 may, for example, be compliant with Ethernet 10 Base T, 100 Base T or other types of physical layer implementations of local area networks. The network ports 12-1, 12-4 may also be compliant with ATM, PPP/SONET or Frame Relay wide area networks. The ports 12-1, 12-4 may provide connections to access devices, routers, switches, other servers, or other devices in a manner that will be described in further detail below.

The other ports 12-2, 12-3, referred to herein as the server ports, provide a connection for passing message traffic to the server 20. These ports may also provide typically the same sort of physical layer link as provided for the respective network ports 12-1, 12-4.

The switches 14-1, 14-2 provide essentially two different operating modes for the redirector 10. In a first mode, referred to as the operational mode, traffic is routed through the server 20 by placing the switches 14 in the position "A" labeled in FIG. 1. In other words, in the operational mode, message traffic arriving on port 12-1 is routed to port 12-2 and then to the server 20. Similarly, traffic arriving on the port 12-4 is routed to port 12-3 and up to the server 20. Furthermore, outgoing traffic from the server 20 received on port 12-2 is routed to port 12-1, and likewise, outgoing traffic from server 20 received on port 12-3 is routed to port 12-4.

A second mode for the redirector 10 is to place the switches 14 in the position "B", referred to as a standby mode. In this mode, the message traffic is routed directly from port 12-1 to port 12-4, and likewise from port 12-4 to 12-1, without passing through the server 20.

In accordance with a number of different possible events, as described herein below in further detail, the logic 16 is used to control the state of the switches 14 to select either the operational mode or the standby mode.

In normal operation, that is, once the server 20 is operational and in a known good state, the operational mode is selected whereby the switches are placed in position A. However, upon the occurrence of various failure conditions that are detected by either the redirector 10 and/or the server 20, the switches 14 are operated to position B to enter the standby mode.

Switching between modes is accomplished by the specific implementation of the control logic 16. For example, the control logic 16 may switch modes in the event of redirector failure, server link failure or inactivity, server watchdog timeout, or server forced shut down conditions. For example, if the control logic 16 circuit detects that a redirector 10 power failure or watchdog time out 17 has occurred within the redirector 10 itself, the standby mode is selected.

The redirector 10 may also selectively redirect messages on a packet by packet basis, by type of message received, client address or application, server address or application, adjacent hop address, or other parameters, as will be described in greater detail below.

Server link inactivity status detection involves monitoring the status of the server ports 12-2 and 12-3. If an inactive state is detected on either port, the redirector 10 enters the standby mode. To accomplish this, one or more explicit signals 19 are preferably passed from the server 20 to the redirector 10. The explicit signals 19 may be provided either by out of band signaling on one of the links connected to ports 12-2 or 12-3, or via a physically different connection such a as separate Ethernet or RS-232 type connection.

These explicit signals 19 also enable the implementation of a server watchdog timer that is used to detect software locks or crashes in the server 20. For example, the server 20 may be expected to provide a refresh command on a periodic basis via the explicit signal 19. If the control logic 16 does not detect the occurrence of a status refresh command, then the standby mode is selected. It is preferable that the server 20 and control logic 16 also permit a programable server watchdog timer interval, so that an optimum timing interval can be determined, although a time period of approximately 200 milliseconds is likely sufficient.

Finally, the explicit signal 19 may provide a command to allow the server 20 to force the redirector 10 into a standby mode and back to operational mode. This feature can be used to provide orderly shut down when the server 20 as had an on catastrophic failure or is, for example, being shut down for maintenance.

It may also be desirable to disable the server watchdog timer 29 to enable, for example, expediting debugging of the system. The preferred grouping of the system ports 12-2, 12-3 on the redirector 10 is that they act as a single unit for any failure as denoted by the dotted lines between the switches 14. If a link failure is detected, on for example, server port 12-2, the control logic 16 always switches both channels to the standby mode. The system is designed such that it is never able to achieve a state whereby the switches 14 are in opposing positions.

Also as shown in FIG. 1, the server 20 consists of network interface circuits 22-1, 22-2 respectively connected to one of the ports 12-2, 12-3 of the redirector 10, a protocol conversion function 24, traffic processing function 26, watchdog timer functions 29, and mass storage device(s) 28.

The NICs 22 provide physical interconnect circuits that allow the server 20 to receive and forward messages to the redirector 10. Protocol processing function 24 preferably implements functions such as link layer proxying such that the server 20 acts as a proxy for link layer addresses.

The traffic processor 26 provides the remaining functions consistent with the intended purpose of the server 20. For example, in the preferred embodiment, the server 20 is a cache server, which provides for caching of network documents on the mass storage device 28. However, it should be understood that the server 20 may perform other functions such as network management and monitoring.

Finally, the timer functions 29 are implemented to provide the preferred server watchdog time out functions such that the server 20 provides periodic status signal to the redirector 10 in a manner which has already been described. The watchdog timer 29 may, for example, keep track of instructions being executed by the server 20 to ensure that no software lockup or failure conditions have occurred. It may also detect frequent repetition of the same instructions and assumes in such a state that the server 20 is misbehaving. This can result from software bugs that intriguer an infinite instruction loop, or from a security breach such as a denial of service attack, that may occur when an intruder is repeatedly sending spurious packets to the server 20. The watchdog timer 29 may also be triggered by failure of hardware conditions.

While the redirector 10 can be switched from the operational mode to the standby mode by any of the foregoing events, it is preferred that the control logic 16 be implemented in such a way that only the server 20 is capable of controlling the retransition of the redirector 10 back to the operational mode.

For example, if the redirector 10 detects a failure on links 12-3 or 12-2 the redirector 10 stays in standby mode until the server 20 sends a re-enable command. The server 20 is also able to query the redirector 10 to verify that all failure conditions are cleared before sending the enable command to the redirector 10.

The redirector 10 is a device that enables on-line deployment of the server 20 or other traffic processor such as a document cache. Under normal operation, the traffic is directed to the server 20 for processing such as for performing the caching function. However, the redirector 10 also detects failures of the server 20, and within a short amount of time, switches line traffic to bypass the server 20 altogether. The net effect is to achieve fail safety for the server 20 in the sense that a failure of the server only eliminates its benefits without involving the need to reprogram routers or otherwise upset the configuration of the LAN or WAN 15.

As a result, cache servers 20 may deployed in-line in the network without the need to modify routing tables or other software or hardware in the network 15, in addition, achieving fully transparent operation for clients and/or servers at the edge of the network 15.

In addition, the switches 14 within the redirector 10 may actually be packet intelligent switches that pass only certain types of traffic through the switches 14. For example, the switches 14 may include a packet filtering function whereby only certain types of message traffic is routed to the server 20 and other traffic is cut through. Routing may be specified based upon type of packet, source or destination address, source or destination application, or next or previous network node address.

If the server 20 is deployed at an Internet Service Provider, and the function of the cache server 20 is to cache documents that are in the form of pages to be displayed within the context of the World Wide Web, the redirector 10 may also recognize messages being specified in the Hyper Text Transfer Protocol (HTTP), and route only such messages to the server 20.

The redirector 10 may also be configured to limit the amount of selected traffic types that it accepts based upon a load shedding or back pressure mechanism. This allows a particular server 20 to control the maximum number of requests for data while allowing other traffic of the same type to be cut through.

Figure 11:
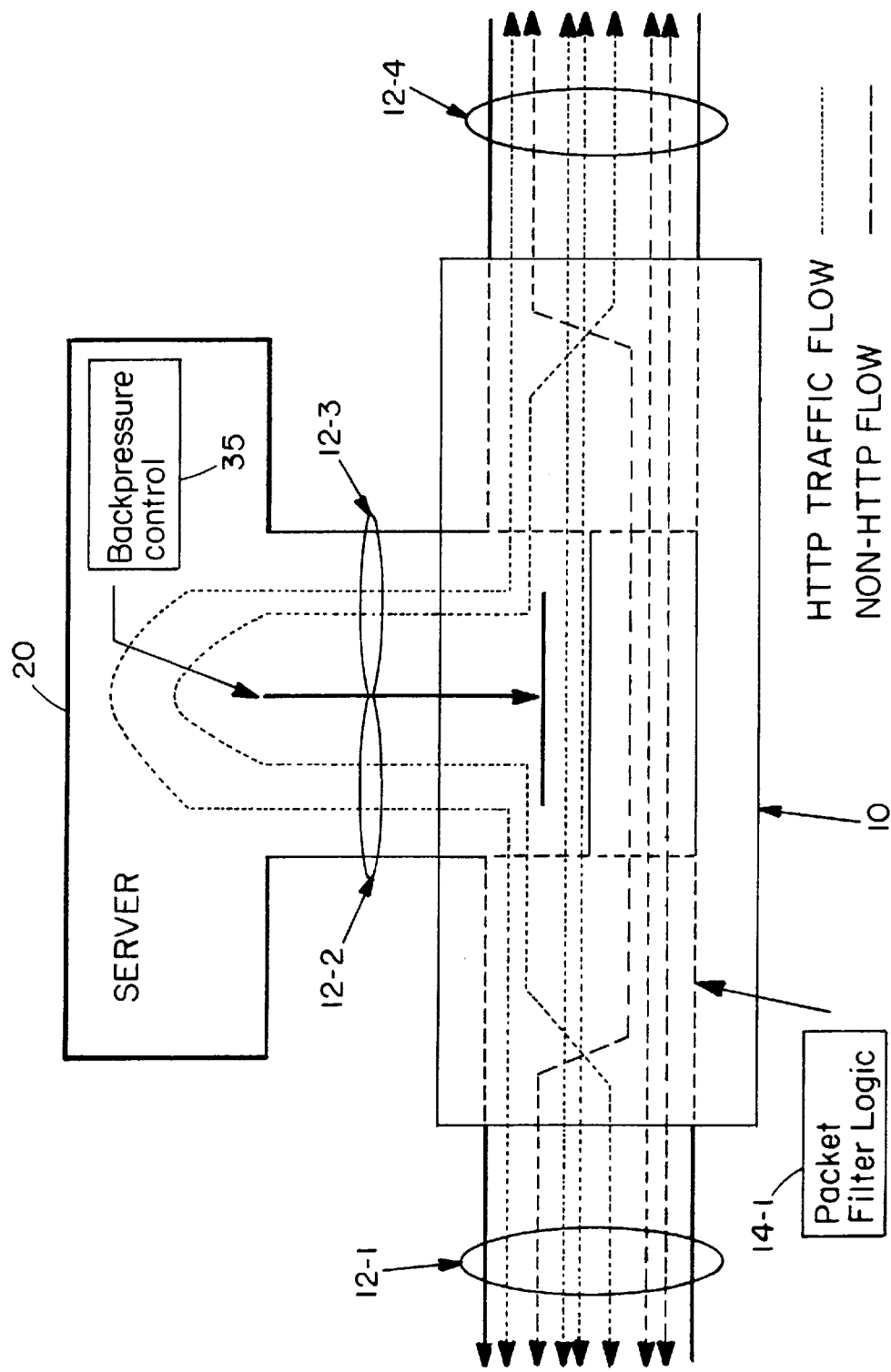
FIG. 11 is a block diagram of a redirector with load shedding or back pressure control.

For example, as shone in FIG. 11, the packet filtering switches 14-1 may cut through all non-HTTP traffic while routing HTTP traffic, such as requests for web pages, to the server 20. In this instance, the server 20 includes back pressure logic 35 which controls the amount of HTTP traffic which server 20 accepts, such as by limiting the number of connections, as indicated by source of destination address, the server 20 is expected to handle.

The invention has several advantages. First, link layer redirection versus router level redirection provides for greater scalability in the deployment of caches 20.

Furthermore, the invention provides for fully transparent deployment of the cache 20 in particular since the caches 20 are transparent at the IP layer, routing tables or other devices on the local area network 15 do not need to be updated. In other words, the deployment of the link layer redirector 10 together with the server 20 provides for deployment of cache server 20 without the need to change the logical topology of the network at the data link or Internet network protocol layer.

Figure 2:
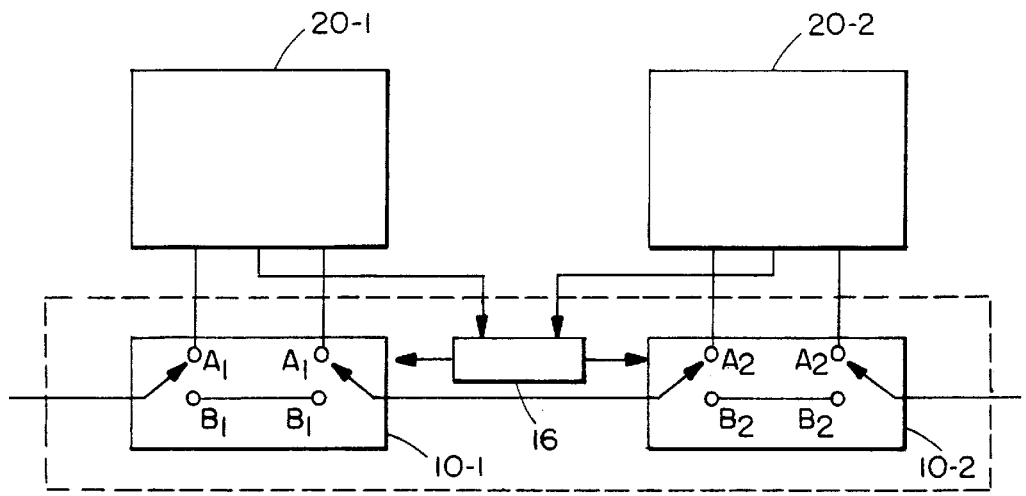
FIG. 2 is a diagram of one embodiment of the link layer redirector for use with multiple servers arranged in series.

FIG. 2 is a block diagram of a preferred embodiment of the invention in which two redirectors 10-1 and 10-2 are implemented together in a common hardware configuration. The connections to the pair of redirectors 10-1 and 10-2 are such that a pair of network servers 20-1 and 20-2 may be deployed in series. In this type of deployment, the control logic 16 is modified to control the individual redirectors 10-1 and 10-2 appropriately. In this scenario, either the first redirector 10-1 is in the operational mode or the second redirector 10-2 is in the operational mode, or both are in the operational mode at the same time. The benefit of implementing the redirectors 10 in this manner is that one can serve as a backup for the other.

Figure 3:
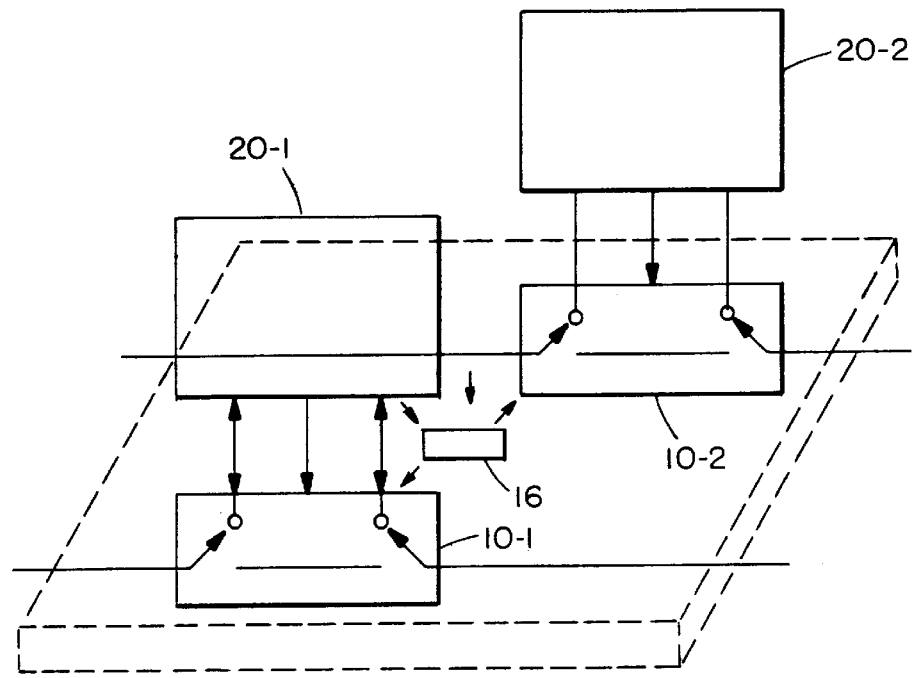
FIG. 3 is a diagram of a preferred embodiment of a link layer redirector with network servers deployed in parallel.

Similarly, as shown in FIG. 3, the external connections for the packaged devices may provide for connections to the servers 20-1 and 20-2 in parallel. It should be understood that this concept may be extended to deploying a number, n, of redirectors 10 and servers 12 in parallel.

Figure 4:
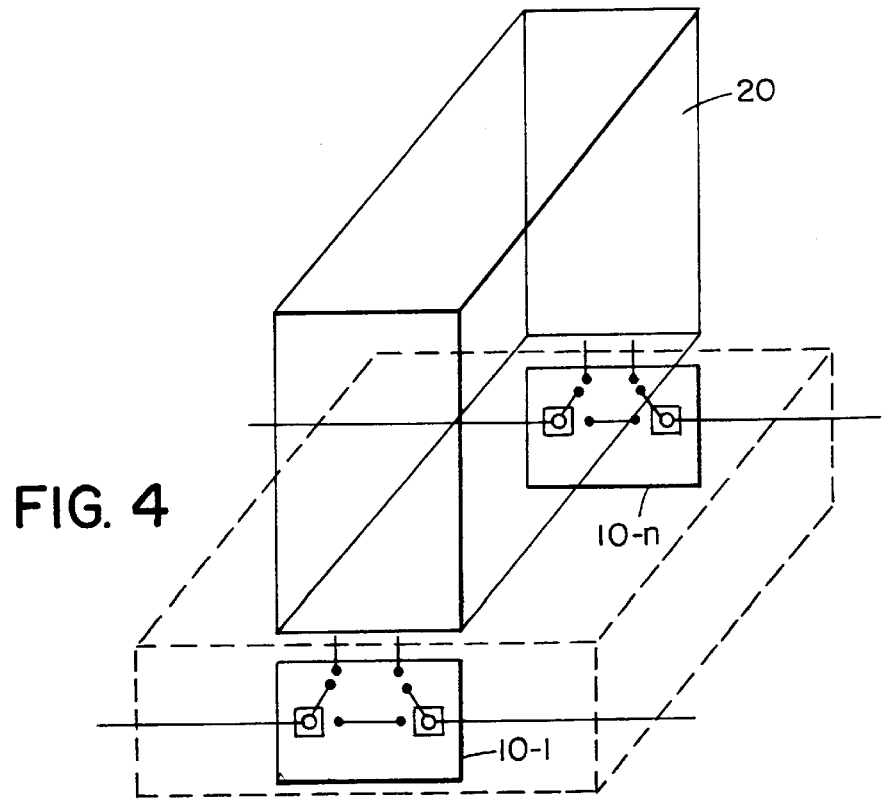
FIG. 4 illustrates how a single network server may be multiplexed among several redirectors.

As shown in FIG. 4 several redirectors 10-1, . . . , 10-n ay be multiplexed to serve a single network server 20.

Figure 5:
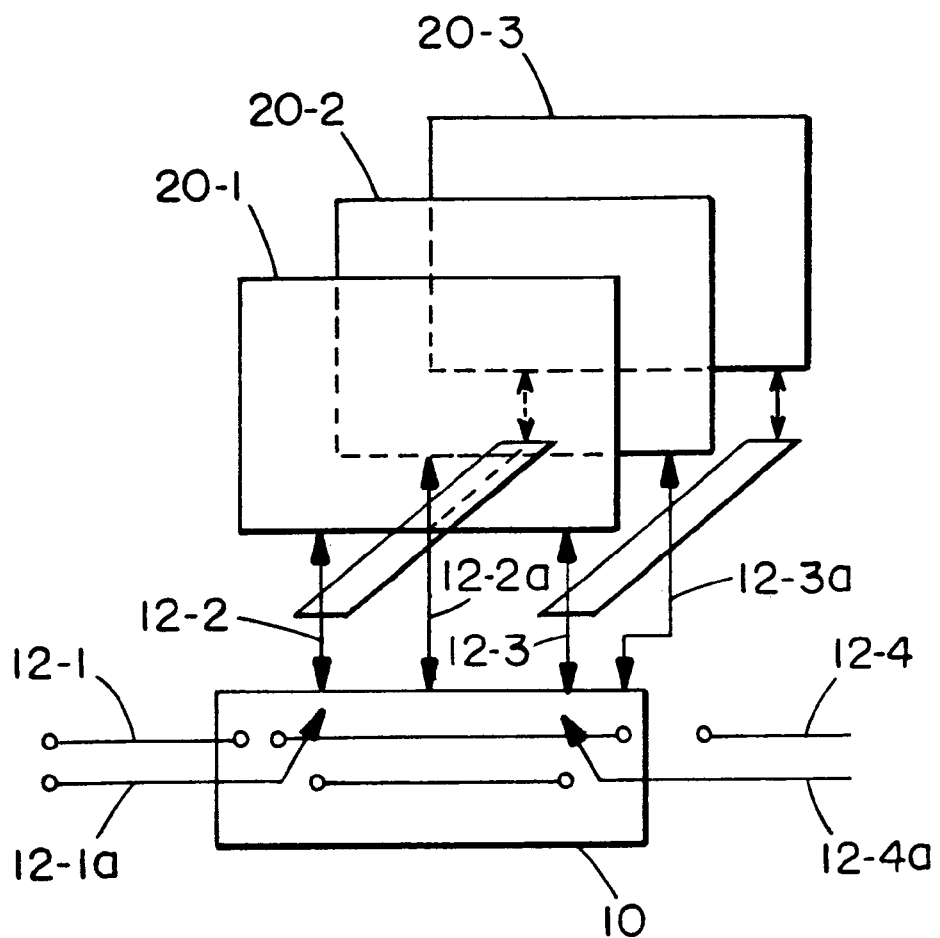
FIG. 5 is another application of the link layer director for use with multiple cache servers connected to given port pairs and redundant connections.

Furthermore, as shown in FIG. 5, multiple network servers 20-1, 20-2, 20-3, . . . , 20-m may be deployed from the ports 12-2, 12-3 of a given redirector 10. This scenario may make use of redundant input lines and internal buses as shown. Therefore, the switches 12 are implemented as intelligent switches that can direct any one of n input lines to any m network servers, where m is greater than or equal to n, and where n is greater than or equal to 2.

In this embodiment the redirectors 10 may also contain intelligence to cut through all traffic when a predetermined number of servers 20 fail.

Figure 6:
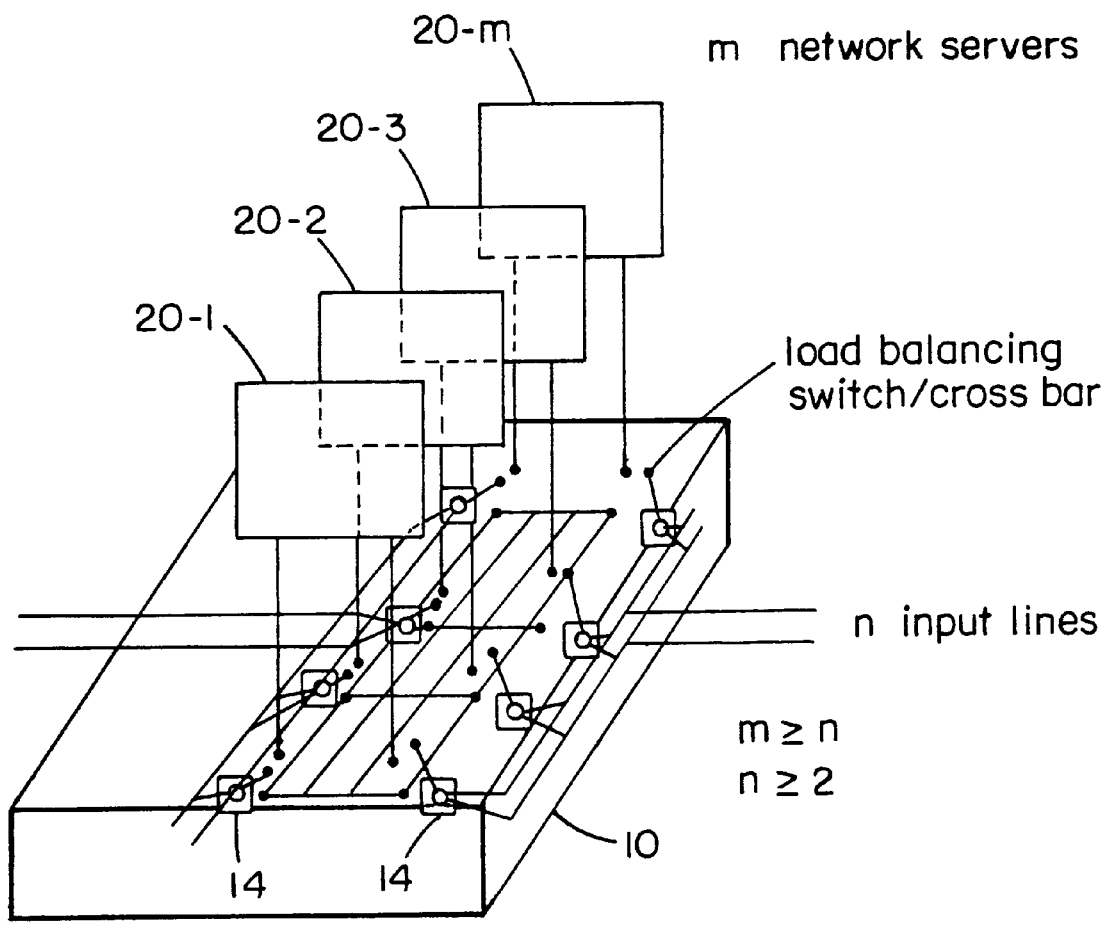
FIG. 6 depicts a redirector with integrated load balancing.

FIG. 6 extends the concept to a message redirector 10 which supports load balancing among multiple servers 20. In particular, it is desirable to share the processing load among several servers 20. In this embodiment, the switches 12 are typically connected via packet intelligent switches that can control redirection of messages to particular servers 20 based upon information in each message. The redirection may be based upon client or server addresses, client or server application, or other criteria as already described elsewhere.

Figure 7:
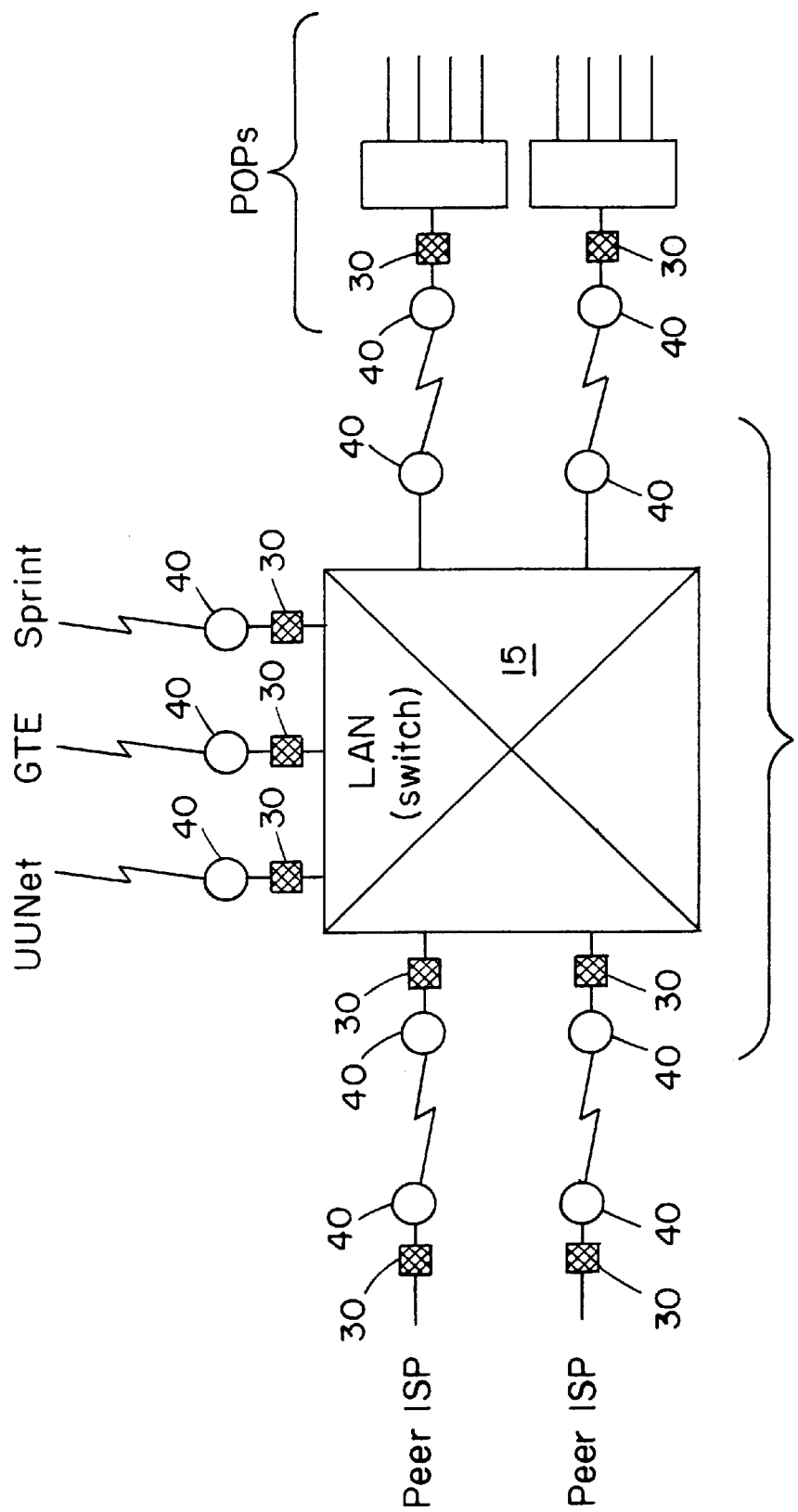
FIG. 7 is a diagram depicting the deployment of the redirector and network cache server at an Internet service provider or large-scale enterprise.

The advantages of the invention are evident from considering the typical deployment of the redirector and cache server at, for example, a Internet Service Provider (ISP). As shown in FIG. 7, the combination of a redirector 10 and cache server 20 is referred to in this drawing as a redirecting cache server 30 and is illustrated by the shaded boxes. Network routers 40 are indicated by the circles, and a local area network 15 is deployed as a switch interconnecting the devices.

Incoming connections from client computers are provided from the Point of Presence (POP) connections on the right side of the figure. Redirecting cache servers 30 may now be deployed in line in accordance with the invention. In addition, redirecting cache servers 30 may be deployed in line with the backbone links to various Internet providers such as UUNet, GTE, Sprint and the like. Furthermore, cache servers 30 may be deployed in line with peer ISP connections.

Figure 8:
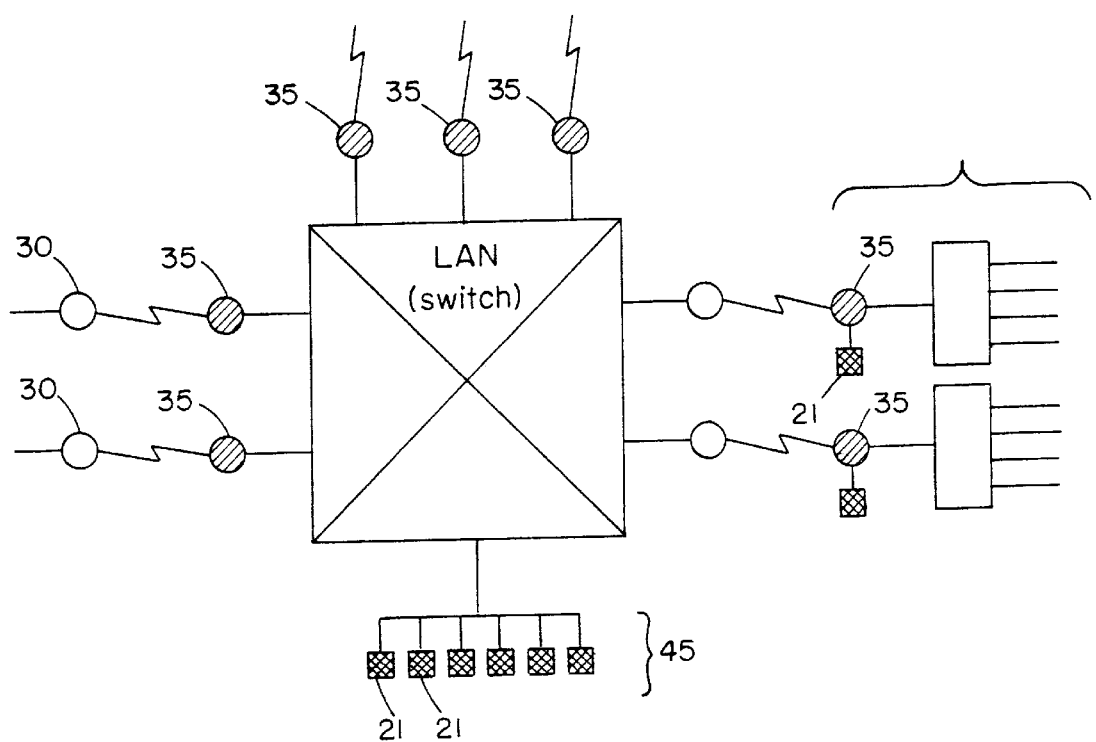
FIG. 8 is a block diagram of competing arrangement for deployment of a cache farm which requires reprogramming of routers and increases traffic load in said routers.

Contrast this with the deployment shown in FIG. 8 of cache farms 45 such as in the prior art wherein the routers 30 must be used together with redirecting routers 35 in line with each of the POPs, Internet backbone links, and peer ISP connections. The redirecting routers 35 must, therefore, be reprogrammed in the event of a failure of one of the caches 21 in the cache farm 45. Furthermore, the load on the routes 35 is increased.

Figure 9:
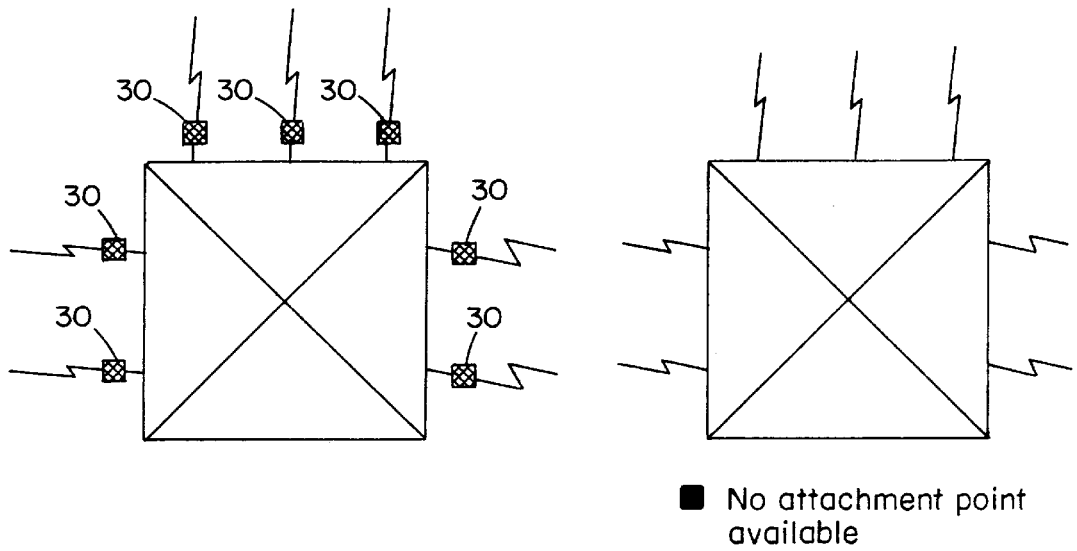
FIG. 9 illustrates one way in which the invention may be deployed at a switched interchange point where traditional network layer routers may not be deployed.

FIG. 9 shows the invention at a multiple switched interchange point, with the use of the redirecting cache servers 30 deployed in line similar to that shown in FIG. 7. In the competing arrangement, shown on the right hand side of FIG. 9, no attachment point is available.

Figure 10:
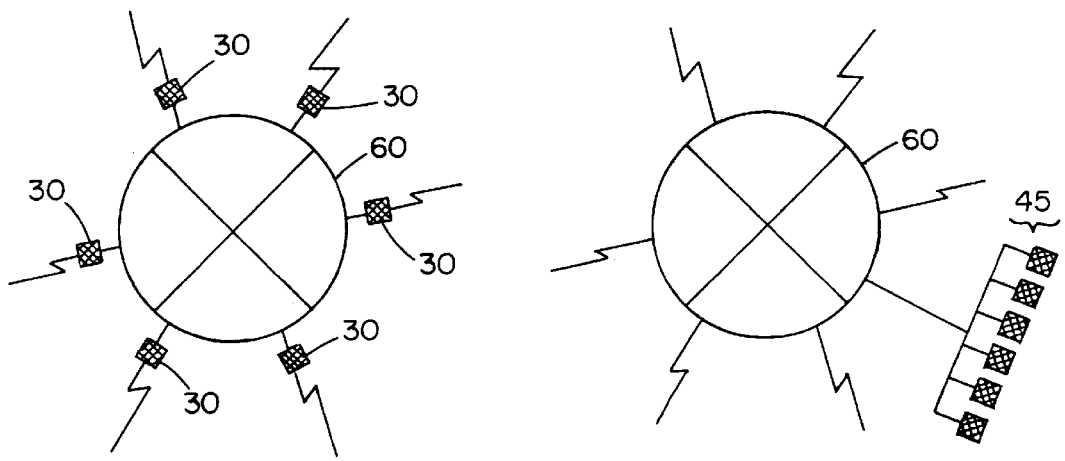
FIG. 10 illustrates one way in which the invention may be deployed in a highly available manner at a single router interchange point reducing traffic load on said router.

Finally, with respect to the type of network connection shown in FIG. 10, such as a single router 60 interchange point, the single router 60 may have redirecting cache servers 30 deployed in line in each of the incoming links. Such a connection is not possible in the prior art whereby a cache farm 45 must be deployed off to the side of the router 60, which in addition must be a redirecting or reprogramable router.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. An apparatus for receiving messages from a network comprising:
   (a) a traffic processor, for processing messages in a manner which is transparent to other devices connected to the network;
   (b) a message redirector, comprising a cut through switch which is selectively activated upon failure of the traffic processor; and
   (c) a controller, connected between the traffic processor and the message redirector, to control the state of the cut through switch,
      wherein the message redirector connects to a plurality of cache servers in a failsafe topology and when a predetermined number of cache servers fail, directs the controller to activate the cut through switch.

2. An apparatus as in claim 1 wherein the traffic processor processes messages at a link layer in a protocol stack.

3. An apparatus as in claim 1 additionally comprising:
   (d) a watchdog timer, disposed in the message redirector, and connected to control the cut through switch.

4. An apparatus as in claim 1 additionally comprising:
   (d) a watchdog timer, disposed in the traffic processor, and connected to control the cut through switch.

5. An apparatus as in claim 1 wherein the cut through switch is selectively activated based upon a type of message received.

6. An apparatus as in claim 1 wherein the cut through switch is selectively activated based upon an address in a message received.

7. An apparatus as in claim 6 wherein the address is an Internet protocol layer address.

8. An apparatus as in claim 1 wherein multiple message redirectors are connected to a given traffic server.

9. An apparatus as in claim 1 wherein multiple traffic servers are connected to a given message redirector.

10. An apparatus as in claim 9 wherein the message redirector implements load balancing among the multiple traffic servers.

11. A method for use in a computer network for processing messages received by a network traffic server comprising a traffic processor, said network traffic server implementing a layered communication protocol, the method comprising the steps of:

(a) processing messages by receiving requests from clients in a network and responding thereto; and (b) redirecting client request messages by selectively activating a cut through switch to bypass the network traffic server altogether upon failure of the step of responding to the client requests, characterized in that the traffic processor uses a link layer of said communication protocol for redirecting client requests without modifying high level protocol layers of other devices connected to the network, this processing being thereby transparent to the other devices connected to the network.

12. A method as in claim 11 wherein the step of processing messages comprises the step of retrieving documents from a local cache server.

13. A method as in claim 11 wherein the step of processing message traffic further comprises the step of:

(c) controlling the step of redirecting messages with a watchdog timer.

14. A method as in claim 11 wherein the step of redirecting messages further comprises:

(c) controlling the redirection of messages with a watchdog timer.

15. A method as in claim 11 wherein the step of redirecting messages is selectively performed based upon the type of message received.

16. A method as in claim 11 wherein the step of redirecting messages is selectively performed based upon an address in the message received.

17. A method as in claim 16 wherein the address is an Internet protocol layer address.

18. A method as in claim 11 wherein the step of redirecting messages is performed upon messages received in line from the network.

19. A method as in claim 11 wherein the step of redirecting messages is carried out with a four port device having two ports connected to external network ports and two ports connected to a message traffic processor which carries out the message processing step.

20. A method as in claim 11 wherein the step of redirecting client request messages further comprises the step of:

(c) selectively redirecting messages between two external network ports or between two ports connected to carry out the message processing step.

21. A method as in claim 11 wherein the step of redirecting client request messages additionally comprising the step of:

(d) routing a message among multiple message redirectors to carry out the message processing step.

22. A method as in claim 11 additionally comprising the step of:

(e) load balancing among multiple traffic processors.

23. A method for processing messages received from a network comprising the steps of:

(a) processing message traffic in a manner which is transparent to other devices connected to the network;

(b) redirecting messages by selectively activating a cut through switch upon failure of the message traffic processing step; and (c) load balancing among multiple traffic processors,
wherein the step of processing message traffic handles messages at a link layer protocol, and such step of processing messages is carried out by the multiple traffic processors; and
wherein the step of redirecting messages is carried out by a single message redirector.

* * * * *